F. RUDOLPHI.
DOUBLE SEAMING MACHINE.
APPLICATION FILED FEB. 23, 1909.
975,574.
Patented Nov. 15, 1910.
5 SHEETS—SHEET 1.
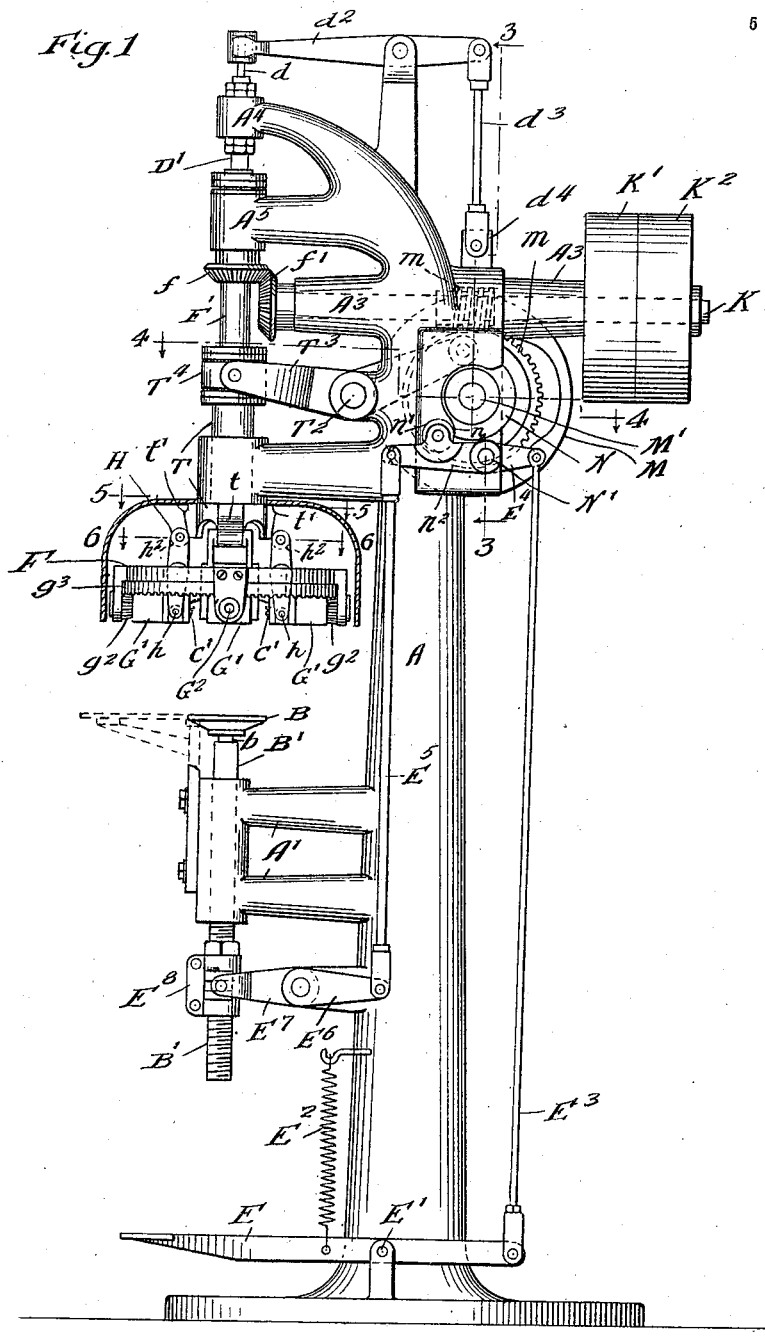
Witnesses:
Wm. Geiger
H. M. Munday
Inventor:
Frank Rudolphi
By Munday, Evarts, Adcock & Clarke.
Attorneys

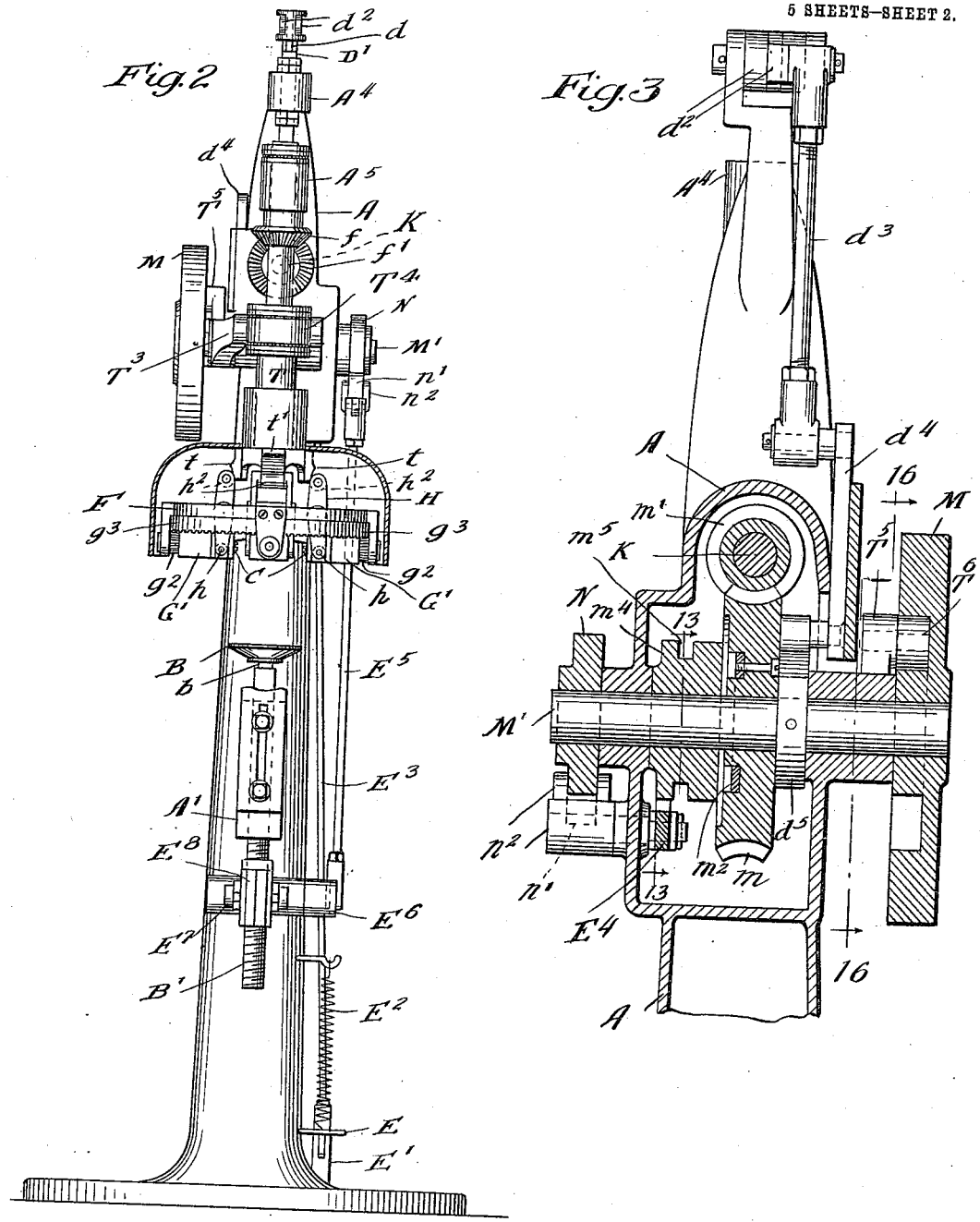

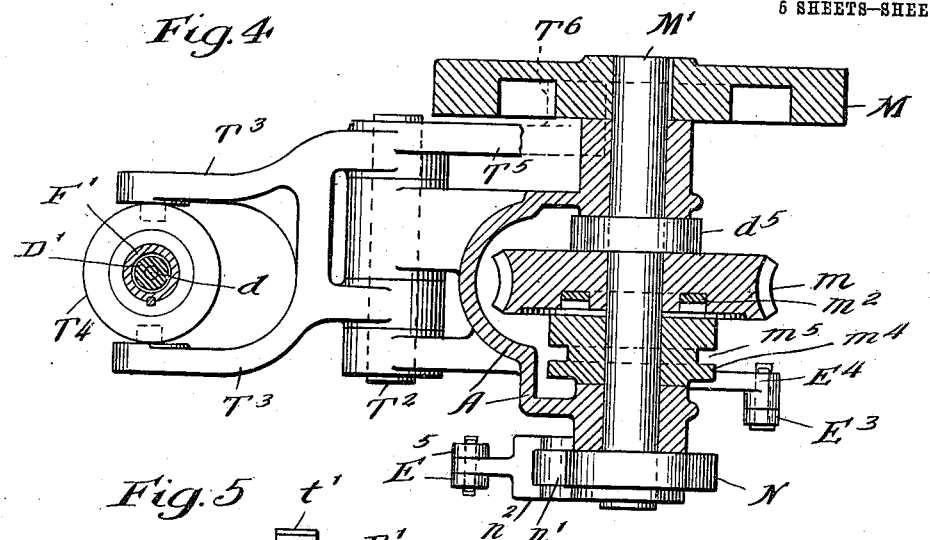
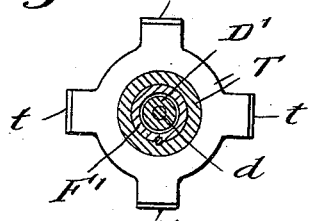
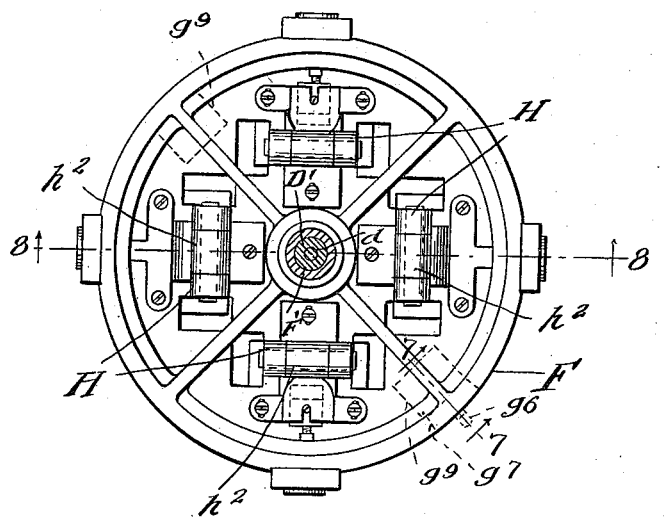
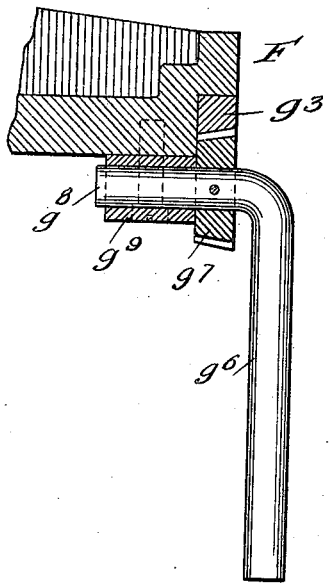

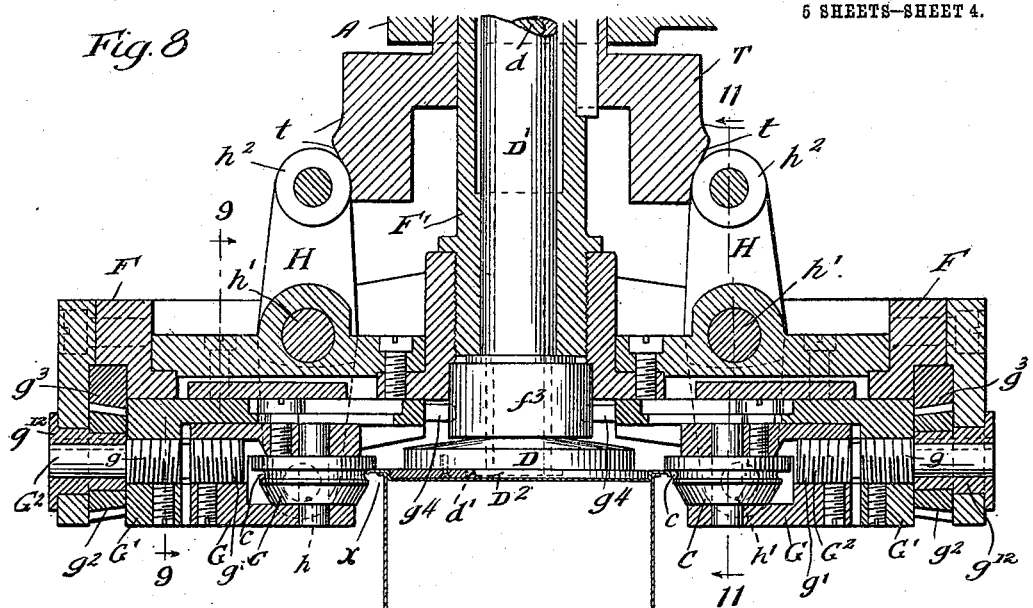
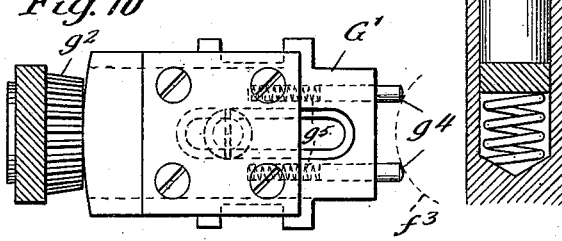
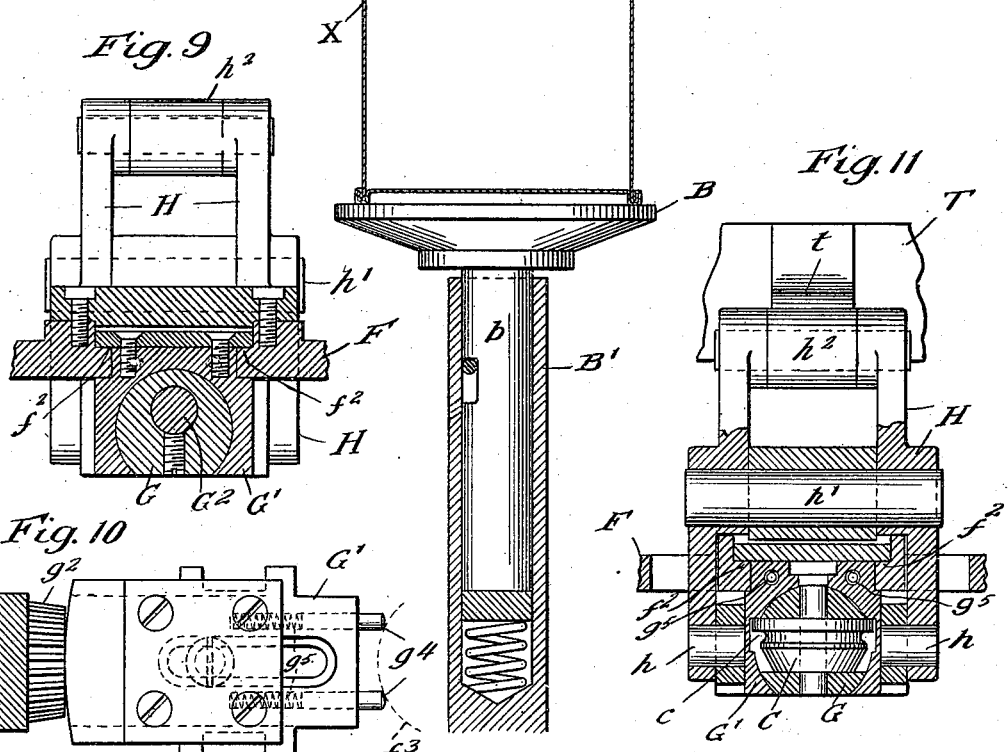

F. RUDOLPHI.
DOUBLE SEAMING MACHINE.
APPLICATION FILED FEB. 23, 1909.
975,574.
Patented Nov. 15, 1910.
5 SHEETS—SHEET 5.
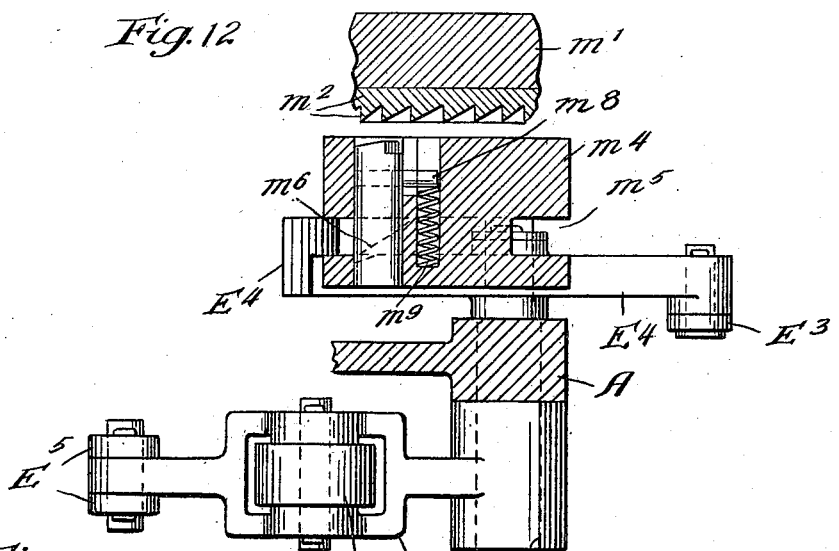
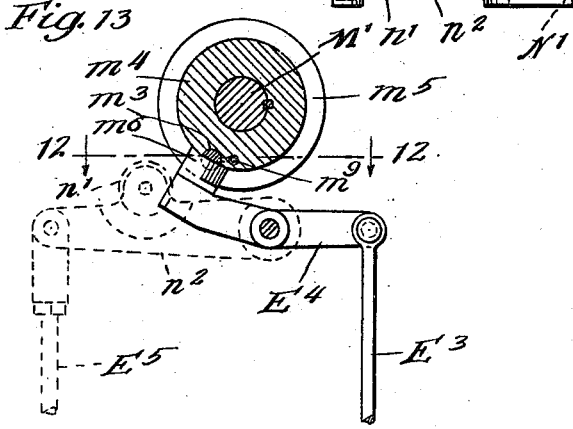
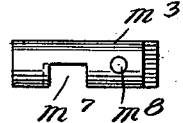
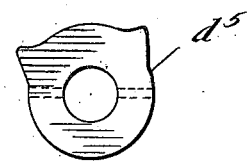
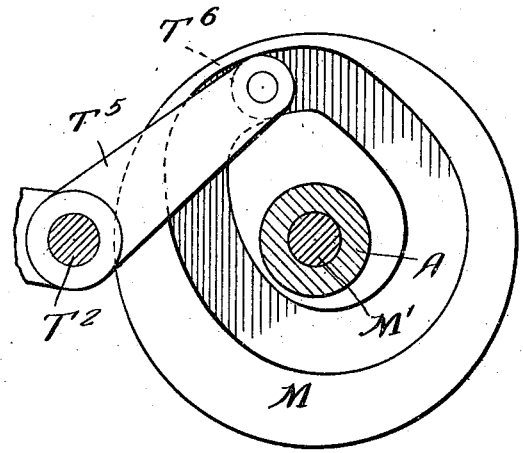
Witnesses:
Inventor:
Frank Rudolphi
By Munday, Evarts, Adcock & Clarke.
Attorneys

UNITED STATES PATENT OFFICE.

FRANK RUDOLPHI, OF CHICAGO, ILLINOIS.

DOUBLE-SEAMING MACHINE.

975,574.  Specification of Letters Patent.  Patented Nov. 15, 1910.

Application filed February 23, 1909. Serial No. 479,308.

*To all whom it may concern:*

Be it known that I, FRANK RUDOLPHI, a citizen of the United States, residing in Chicago, in the county of Cook and State of Illinois, have invented a new and useful Improvement in Double-Seaming Machines, of which the following is a specification.

This invention relates to improvements in double seaming machines.

The object of this invention is to provide a stationary can double seaming machine of a simple, efficient and durable construction, composed of few parts and capable of being cheaply manufactured, in which the seaming rollers may be positively, directly and exactly actuated as required for the production of hermetically tight seams with certainty and reliability, and in which the machine may be easily and quickly set or adjusted for operation upon cans of different diameters.

In this invention, the vibrating levers for actuating the seaming rollers are so arranged and combined with their actuating cams, their fulcrums and the slides or holders upon which the seaming rollers are directly mounted, that these actuating levers always remain substantially upright and parallel to each other at the time of the seaming operation, the pivotal connection between the lower arm of each operating lever and the slide or holder upon which the seaming roller is mounted being also directly in line horizontally with the seam to be formed, or with the operating groove or face of the seaming roller, so that the seaming is done by a positive, direct and straight line pressure, the levers thus producing no downward or upward pressure upon the holder or slide which carries the seaming roller, and thus avoiding all irregularities and inequalities of operation which is due to the friction or binding action of the seaming roller slide or holder in its guide or ways in cases where the actuating levers are so arranged and combined with the other parts as to exert more or less downward or binding pressure upon the seaming roller slides.

In this invention also, each seaming roller slide or holder is furnished with an adjustable member and adjusting screws furnished with gears intermeshing with a common gear or ring, so that all the seaming rollers may be simultaneously and similarly set or adjusted in or out as required for operation upon cans of different diameters by simply turning one of the adjusting screws. The adjusting screw between each of the seaming roller slides or holders and the adjustable member thereof are preferably right and left threaded, thus materially increasing the range of adjustment.

The invention further consists in the novel construction of parts and devices and in the novel combination of parts and devices herein shown and described.

In the accompanying drawing forming a part of this specification, Figure 1 is a side elevation partly in section. Fig. 2 is a front elevation partly in section. Fig. 3 is a detail vertical section on line 3—3 of Fig. 1. Figs. 4, 5 and 6 are detail horizontal sections on lines 4—4, 5—5 and 6—6 of Fig. 1 respectively. Fig. 7 is a detail section on line 7—7 of Fig. 6. Fig. 8 is a detail vertical section on line 8—8 of Fig. 6. Fig. 9 is a vertical section on line 9—9 of Fig. 8. Fig. 10 is a detail plan view of one of the movable members, partly in section. Fig. 11 is a detail vertical section on line 11—11 of Fig. 8. Fig. 12 is a partial horizontal section on line 12—12 of Fig. 13. Fig. 13 is a vertical section on line 13—13 of Fig. 3. Fig. 14 is a detail view of the knock-out cam. Fig. 15 is a detail elevation of the clutch pin and Fig. 16 is a cross section on line 16—16 of Fig. 3.

In the drawing, A represents the frame of the machine, B the lower reciprocating chuck or can holder having a stem or shank $b$ fitting in a suitable socket in the vertically movable rod $B^1$ which reciprocates up and down in a suitable guide $A^1$ on the frame of the machine. The can holder stem $B^1$ is operated or moved up and down as required to chuck or clamp the can against the opposing non-rotating chuck or can holder disk D by means of a foot lever or treadle E, pivoted to the frame at $E^1$ and furnished with a spring $E^2$ for returning it to position. This treadle is connected by a link $E^3$ with levers $E^4$ and $n^2$ that are connected by a link $E^5$ with a lever $E^6$ having a forked arm $E^7$ engaging an adjustable connecting block $E^8$ on the screw threaded lower end of the can holder stem $B^1$.

F is a continuously rotating seaming head upon which the two pair of seaming rollers C and $C^1$ and their movable slides or holders G and their operating levers H are mounted. The rotary seaming head F is secured to a hollow rotating shaft or sleeve $F^1$ surrounding the stem $D^1$ of the upper non-rotating chuck D and is continuously and rapidly rotated by means of a bevel gear $f$ thereon which meshes with a bevel gear $f^1$ on the driving shaft K, said shaft K being furnished with fast and loose pulleys $K^1$ $K^2$, and being journaled in suitable bearings $A^3$ on the frame of the machine.

The upper chuck or holder D is provided with a removable ring $D^2$ to fit the can head and thus adapt the machine conveniently for operation upon cans of different sizes by simply removing the ring $D^2$ and replacing it with one of a different external diameter.

The stem $D^1$ of the upper chuck D is preferably a hollow sleeve to receive the stem $d$ of a can ejector disk $d^1$ which is moved up and down as required to discharge the seamed can from the upper chuck D by means of a lever $d^2$, link $d^3$, slide $d^4$ and cam $d^5$ on the shaft $M^1$. The non rotating stem $D^1$ of the upper chuck D extends up through the hollow seaming head shaft $F^1$, and is held in position by guides or arms $A^4$ $A^5$ on the frame of the machine.

The seaming rollers C $C^1$ are each mounted upon a horizontally reciprocating slide or holder G, which is furnished with an adjusting member $G^1$ and an adjusting screw $G^2$ connecting said members, the adjusting screw being furnished with right and left screw threads $g$ $g^1$. Each of the adjusting screws or shafts $G^2$ is further provided with a bevel gear $g^2$ which meshes with an annular gear $g^3$, so that when one of these adjusting screws is turned, the adjusting screws of all the other seaming roller slides will be similarly turned, thus simultaneously and equally adjusting or setting all the seaming rollers for operation upon cans of different diameters. Each adjusting screw $G^2$ has a sliding connection with its gear $g^2$ through the interposed sleeve or bushing $g^{12}$ to which the gear $g^2$ is directly fixed and in which bushing the reduced end of the screw shaft $G^2$ slides as the tool holder G and its adjusting member $G^1$ rigidly connected thereto by the screw $G^2$ are radially reciprocated by the operating lever H.

The seaming roller slides move in suitable radial guides or ways $f^2$ on the seaming head. The seaming rollers C $C^1$ are each mounted directly upon the adjustable member $G^1$ of the seaming roller slide or holder G so that the seaming rollers may be moved relatively in or out for operation upon cans of different diameters without disturbing the relative straight line arrangement of the pivot pin $h$ which connects the operating lever H with the seaming roller slide, so that this pivotal connection between the seaming roller operating lever and the seaming roller slide or holder may always be directly under the fulcrum $h^1$ of the lever H, and so that the pressure or force applied to the slide G from the operating lever H will always be in a straight horizontal direction, and in line with the seam $x$ being formed on the can X, or with the operating face or groove $c$ of the seaming roller C or $C^1$ at the time the seam is being formed or compressed. This straight line connection insures absolute uniformity of pressure being exerted by each seaming roller upon the seam, and prevents the operating levers from exerting any binding action upon the seaming roller slides or holders, and a portion of the seaming force or pressure being thus absorbed with consequent irregularity and imperfection of the seam produced.

The seaming roller levers H carry at their upper ends a roller $h^2$ for engagement with the cam face $t$ of the actuating cam or slide T which surrounds and rotates with the hollow shaft $F^1$ of the seaming head F, but is adapted to be reciprocated independently of the seaming head. The reciprocating cam T has two opposite cam faces $t$ $t$ for actuating the forming rollers C, and a pair of differently located inclines or cam faces $t^1$ for actuating the finishing rollers $C^1$, one pair of these cam faces being higher up than the other to cause the forming and finishing rollers to be successively operated as required.

The cam faces $t$ $t^1$ of the sliding cam T which contact with the rollers $h^2$ on the operating lever H are preferably substantially above and in line with the levers H, so that these levers will remain substantially upright and parallel to each other at the time they are pressing the seaming rollers against the seam.

The seaming roller actuating cam T is reciprocated up and down as required to operate the seaming rollers by means of a rocking lever on pivot or shaft $T^2$ said lever having a forked arm $T^3$ engaging a collar $T^4$ on the sleeve of the cam T, and which rocking lever has an arm $T^5$ carrying a roller $T^6$ which engages a cam M on the cam shaft $M^1$.

The cam shaft $M^1$ is intermittently rotated as required to cause the seaming rollers to be properly actuated during the cycle or period necessary for performing the seaming operation on each can by means of a worm gear $m$ loose on the cam shaft, and continuously driven by a worm $m^1$ on the driving shaft K and which worm gear $m$ is furnished with a clutch member $m^2$ and is adapted to be at intervals clutched to the cam shaft $M^1$ by means of a clutch pin or member $m^3$ of the clutch sleeve $m^4$ which is furnished with an annular groove $m^5$ to receive a wedge or clutch disengaging device $m^6$ that operates to retract the clutch pin or member $m^3$ of the clutch member $m^2$ at each revolution of the grooved clutch sleeve $m^4$ which is fast on the cam shaft $M^1$. The sliding clutch pin or member $m^3$ has a notch $m^7$ to engage the clutch disengaging device $m^6$. The clutch pin or member $m^3$ has a stem $m^8$ engaged by a spring $m^9$ to hold it in engagement with the clutch member $m^2$. The cam shaft $M^1$ is also provided with a stop cam N having a notch $n$ engaging a roller $n^1$ on the arm $n^2$ which rocks on the pivot $N^1$ of the clutch operating lever $E^4$ which is connected with the treadle E.

The seaming roller slide G is furnished with pins $g^4$ which engage the hub $f^3$ of the seaming head, and which pins bear against springs $g^5$ and thus serve to retract the seaming roller slide after each operation.

The tool used for operating the annular gear $g^3$ which operates gears $q^2$ on the shaft $G^2$ is shown in Fig. 7 as being an arm $g^6$ bent at right angles, carrying a gear $g^7$ on the short arm $g^8$ which is inserted in blocks $g^9$ mounted on the rotating seaming head F.

I claim:—

1. In a double seaming machine, the combination with a rotating seaming head, of a plurality of seaming rollers, a plurality of seaming roller holders each having an adjustable member, a plurality of adjusting screws connecting said holders and their adjusting members and means for simultaneously turning said adjusting screws to effect simultaneous and similar adjustment of all the seaming rollers, substantially as specified.

2. The combination with a rotary seaming head, of means for actuating the seaming rollers to form the seam, and unitary means to adjust equally and simultaneously all the seaming rollers for operation upon cans of different diameters without disturbing the relative individual adjustment of the rollers in respect to each other, substantially as specified.

3. A rotary seaming head having a plurality of seaming rollers, a plurality of seaming roller slides each furnished with an adjustable member and with an adjusting screw, and means for simultaneously and equally turning said screws, substantially as specified.

4. A rotary seaming head having a plurality of seaming rollers, a plurality of seaming roller slides each furnished with an adjustable member and with an adjusting screw, and means for simultaneously and equally turning said screws, said adjusting screws having right and left threads, substantially as specified.

5. A rotary seaming head having a plurality of seaming rollers, a plurality of seaming roller slides, each furnished with an adjustable member and with an adjusting screw provided with a gear, and a common gear meshing with the gears of all of said screws to cause them to turn in unison, substantially as specified.

6. In a double seaming machine, the combination with a pair of can holding chucks, of a rotary seaming head having a plurality of seaming rollers, a plurality of horizontally moving holders therefor, each furnished with an adjustable member and a plurality of operating levers pivotally engaging said holders horizontally in line with the operating face of the seaming roller, and each of said levers having its fulcrum directly above its pivotal connection with said holder when the seaming roller is forced against the seam, substantially as specified.

7. In a double seaming machine, the combination with a pair of can holder chucks, of a rotary seaming head furnished with seaming rollers, and horizontally moving radial slides carrying said rollers, and operating levers pivotally connected to said slides horizontally in line with the seam, substantially as specified.

8. In a double seaming machine, the combination with a pair of can holder chucks, of a rotary seaming head furnished with seaming rollers, and horizontally moving radial slides carrying said rollers, and operating levers pivotally connected to said slides horizontally in line with the seam, said seaming rollers being fulcrumed directly above their pivotal connection with said holders to cause the levers to exert a straight line seaming pressure against the seaming roller slides, substantially as specified.

9. In a double seaming machine, the combination with a pair of can holder chucks, of a rotary seaming head furnished with seaming rollers and horizontally moving radial slides carrying said rollers, and operating levers pivotally connected to said slides horizontally in line with the seam, said operating levers being fulcrumed directly above their pivotal connection with said holders to cause the levers to exert a straight line seaming pressure against the seaming roller slides, said seaming roller slides having adjustable members upon which the seaming rollers are directly mounted to enable the rollers to be set or adjusted in and out for cans of different sizes without affecting the straight line action of the levers for operating said slides, substantially as specified.

10. A rotary seaming head having a plurality of seaming rollers and horizontally moving seaming roller holders, each furnished with an adjustable member, and operating levers having their pivotal connection with said holders directly below their fulcrums, substantially as specified.

11. A rotary seaming head having a horizontally moving seaming roller holder, an operating lever for said holder having its fulcrum directly above its pivotal connection with the holder, substantially as specified.

12. A rotary seaming head having a horizontally moving seaming roller holder, an operating lever for said holder having its fulcrum directly above its pivotal connection with the holder, said holder having an adjustable member upon which the seaming roller is directly mounted to enable adjustments in and out to be made without disturbing the relative arrangement of said operating lever, substantially as specified.

FRANK RUDOLPHI.

Witnesses:
PEARL ABRAMS,
H. M. MUNDAY.